United States Patent [19]

Schmutz et al.

[11] 3,852,446
[45] Dec. 3, 1974

[54] ORGANIC COMPOUNDS IN TREATMENT OF PSYCHOTIC DISTURBANCES

[75] Inventors: Jean Schmutz, Muri Near Berne; Fritz Hunziker, Berne, both of Switzerland

[73] Assignee: Sandoz, Inc., Hanover, N.J.

[22] Filed: Mar. 19, 1973

[21] Appl. No.: 342,399

Related U.S. Application Data

[60] Continuation-in-part of Ser. No. 60,976, July 6, 1970, Pat. No. 3,758,479, which is a division of Ser. No. 769,373, Oct. 21, 1968, Pat. No. 3,539,573, which is a continuation-in-part of Ser. No. 712,956, March 14, 1968, abandoned.

[30] Foreign Application Priority Data

| | | |
|---|---|---|
| Mar. 13, 1967 | Switzerland | 3582/67 |
| Mar. 22, 1967 | Switzerland | 4103/67 |
| May 9, 1967 | Switzerland | 6557/67 |
| July 14, 1967 | Switzerland | 10115/67 |
| Nov. 3, 1967 | Switzerland | 15453/67 |
| Feb. 14, 1968 | Switzerland | 2201/68 |

[52] U.S. Cl. ............................................. 424/250
[51] Int. Cl. ............................................. A61k 27/00
[58] Field of Search ....................... 260/268; 424/250

[56] References Cited
UNITED STATES PATENTS

| | | | |
|---|---|---|---|
| 3,107,261 | 10/1963 | Gerber et al. | 260/453 |
| 3,347,849 | 10/1967 | Schmutz | 260/239 |
| 3,458,516 | 7/1969 | Howell et al. | 260/268 |

*Primary Examiner*—Stanley I. Friedman
*Attorney, Agent, or Firm*—Gerald D. Sharkin, Robert S. Honor, Thomas O. McGovern

[57] ABSTRACT

This invention concerns the use of the compound 2-nitro-11-(4-methyl-1-piperazinyl)dibenzo[b,f][1,4]-thiazepine, as a neuroleptic agent.

7 Claims, No Drawings

ORGANIC COMPOUNDS IN TREATMENT OF PSYCHOTIC DISTURBANCES

This is a continuation-in-part application of our co-pending U.S. Pat. application Ser. No. 60,976, filed July 6, 1970, which issued as U.S. Pat. No. 3,758,479 on Sept. 11, 1973, which in turn is a division of our then copending U.S. Pat. application Ser. No. 769,373, filed Oct. 21, 1968, which issued as U.S. Pat. No. 3,539,573 on Nov. 10, 1970, which in turn is a continuation-in-part application of our then copending U.S. Pat. application Ser. No. 712,956, filed Mar. 14, 1968, now abandoned.

This invention relates to dibenzo[b,f] [1,4] thiazepine derivatives and their use as neuroleptics, and especially the compound of formula I,

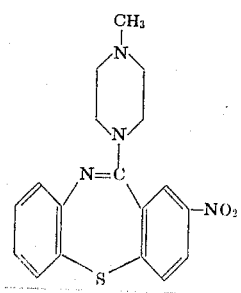

2-nitro-11-(4-methyl-1-piperazinyl)dibenzo[b,f] [1,4]-thiazepine, and non-toxic pharmaceutically acceptable acid addition salts thereof.

A compound of formula I may, for example, be obtained by alkylating, e.g., with a reactive ester of methanol, or with a reductive alkylation mixture containing fomaldehyde, the compound of formula II,

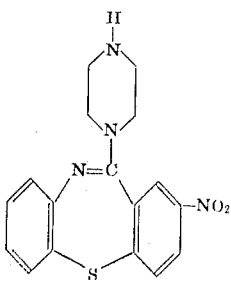

in conventional or known manner.

Preferred reactive esters are esters of hydrohalic acids, sulphuric acid or toluene sulphonic acid. The reducing agent for the alkylation mixture may be formic acid or hydrogen in the presence of a catalyst.

Furthermore the compound of formula I or compound of formula II used as the starting material in the above-mentioned alkylation process, may be obtained by:

a. reacting a compound of formula III,

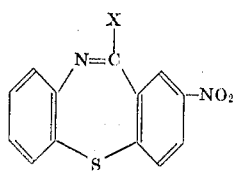

wherein X is a radical capable of being split off with a hydrogen atom bound to the nitrogen atom of an amine, with a compound of formula IV,

wherein R is methyl or hydrogen
in conventional or known manner.

The radical X in the compound of formula III can be bound ionically or covalently to the carbon atom and can be most conveniently represented by halogen, sulfhydryl or alkoxy and alkylthio which may be activated, e.g., methoxy, methylthio or p-nitrobenzylthio, or by tosyl.

The reaction may, for example, be effected in xylene, absolute xylol or absolute dioxane, or excess compound of formula IV as solvent.

The reaction may be preferably effected under reflux conditions.

The reaction may be preferably effected in the presence of, for example, catalytic amounts of acid addition salt forms of compounds of formula III or IV, which salt forms may be formed in situ by the addition of, for example, glacial acetic, acid to the reaction mixture;

b. subjecting to ring closure by intra-molecular condensation acid amides or thioamides of formula V,

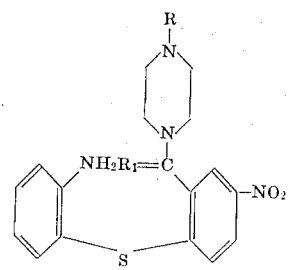

wherein
$R_1$ is oxygen or sulphur, and
R is as defined above.

A purely thermal condensation rarely succeeds with the acid amides but rather with the thioamides, in, for example, pyridine under reflux. Especially in the case of the acid amides it is desirable to perform the ring closure in the presence of condensing agents, such as phosphorus pentachloride, phosphorus oxychloride, phosgene, polyphosphoric acid, and the like at an elevated temperature, for example, at the temperature of the mixture boiling under reflux or 150°C. It is assumed that the ring closure proceeds by way of intermediate steps such as imidochlorides, amidochlorides, imidophosphates, amidophosphates or salt-like derivatives thereof, which, in general, are not isolatable. The condensation of the thioamides is favoured by the presence of mercury (II) salts or by intermediate formation of imidothioethers which may be activated. Heating and, if required, the use of a suitable inert solvent are desirable, and when using phosphorus oxychloride and phosphorus pentachloride, the addition of catalytic amounts of dimethylformamide or dimethylaniline is desirable;

c. reacting the amidine of formula VI,

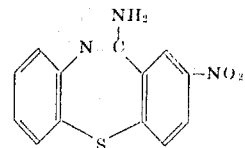

with a reactive ester of the alcohol of formula VII,

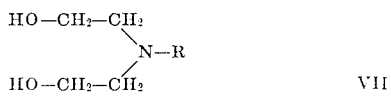

wherein R is as defined above,
in conventional or known manner.

Preferred reactive esters are esters of hydrohalic acids, sulphuric or toluenesulphonic acid, if desired after previous or with simultaneous action of a basic catalyst or metallizing agent, such as sodium amide, lithium amide, sodium hydride, butyl lithium, phenyl sodium, sodium ethylate, or potassium t-butylate;

The amidine of formula VI may be obtained by reacting a compound of formula III with ammonia, in conventional manner.

d. reacting a reaction mixture containing nitrilium of imonium cations of the general formula VIII,

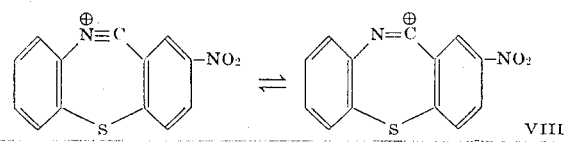

with a compound of formula IV.

The reaction mixture of general formula VIII may, for example, be prepared by intra-molecular Ritter reaction (reaction of the nitrile radical with a phenyl cation) from o-cyano-p-nitro-diphenylsulphides, by Beckmann's rearrangement of 2-nitro-thioxanthone oxime, or by Schmidt reaction of 2-nitro-thioxanthone with hydrazoic acid. Starting with unsymmetrically substituted oximes or ketones, Beckmann's rearrangement and the Schmidt reaction, however yield mixtures of isomers which must be separated; or e. dehydrating a urea derivative of formula IX,

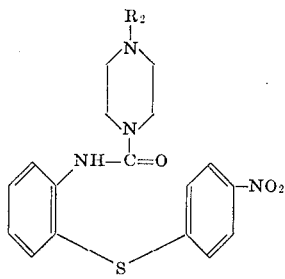

wherein $R_2$ is methyl, hydrogen, or removable group, preferably a hydrolytically removable group.

The dehydrating reaction may be carried out for several hours by dehydrating agents such as zinc chloride, aluminum chloride, tin tetrachloride, phosphoric acid and the like and if required in the presence of an inert solvent of suitable boiling point, such as benzene, toluene etc., but preferably through heating with phosphorus oxychloride in toluene in accordance with the Bischler-Napieralski reaction.

According to the chosen reaction conditions a urea derivative of formula IX with a hydrolytically removable group $R_2$, e.g. carbalkoxy, especially carbethoxy, is cyclicized directly to the compound of formula II by hydrolysis of the removable group. Other removable groups can be split off after ring closure in a way known per se, e.g. by hydrogenolysis.

The compounds of formula III used as starting materials in process variant a) may, for example, be obtained in conventional or known manner by:

a. reacting the lactam of formula X,

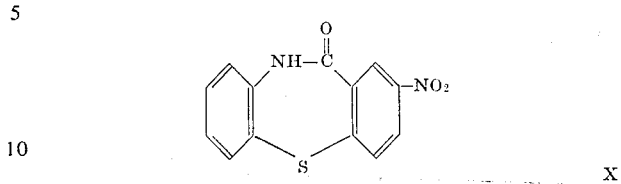

with a halogenating agent, such as phosphorus oxychloride, phosphorus pentachloride or a mixture thereof, preferably in the presence of a catalytic amount of dimethylaniline or dimethylformamide in, for example, chloroform or toluene to produce a compound of formula III wherein X is the corresponding halogen;

b''. reacting a lactam of formula X with phosphorus pentasulphide to produce a tautomer of a compound of formula III wherein X is sulfhydryl, which may be alkylated to produce the corresponding imido-thio ether of formula III wherein X is alkylthio; or c''. reacting a compound of formula III wherein X is sulfhydryl with p-nitrobenzyl chloride in the presence of a strong base, for example potassium tert-butoxide, in, for example, dioxane under reflux to produce a compound of formula III wherein X is p-nitrobenzylthio;

The compounds of formula III may be used in process variant a) in their crude form.

The lactam of formula X used as starting material in the process variant a'') may be obtained in conventional or known manner by:

a'''. subjecting a compound of formula XI,

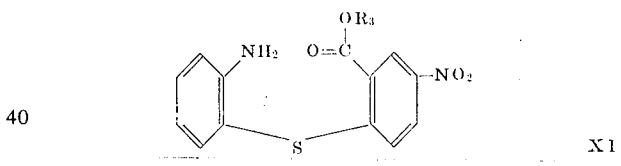

wherein $R_3$ is hydrogen or alkyl,
to a ring closure;

b'''. subjecting a compound of formula XII,

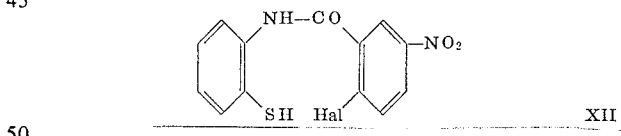

wherein Hal is halogen,
to ring closure;

c'''. subjecting the isocyanate of formula XIII,

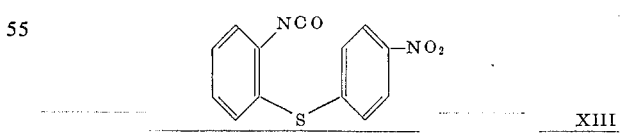

to ring closure, for example, in the presence of phosphorus oxychloride.

This isocyanate of formula XIII may be obtained by introducing while cooling, potassium cyanate in slight excess into an acetic acid solution of o-amino-p'-nitrodiphenylsulphide; or d'''. thermally cyclizing o-amino-p'-nitrodiphenyl sulphide-o'-carboxylic acid.

The acid thioamides of formula V used as starting materials in process variant b) may be obtained from the corresponding acid amide by reaction with phosphorus pentasulphide in, for example, pyridine at reflux. The compound may be used in non-isolated form.

Insofar as the production of the starting materials mentioned above is not particularly described these compounds are known or may be produced and purified in accordance with known processes or in a manner analogous to the processes described herein or to known processes, for instance with the addition of the process of protecting and deprotecting a secondary amino group in a piperazinyl moiety, for example, in a manner analogous to known methods.

The compounds of formulae I and II may be isolated and purified in conventional manner.

The compounds of formulae I and II obtained in this manner are in most cases crystallizable or can otherwise be distilled in high vacuum without decomposition.

Free base forms of compounds of formulae I and II may be converted into acid addition salt forms, and vice versa, in conventional manner. Representative inorganic and organic acids suitable for salt formation are hydrochloric, hydrobromic, sulphuric, nitric, phosphoric, acetic, maleic, tartaric, and toluene sulphonic acids.

The acid addition salt forms are stable in water.

The compound of formula I has not been described in the literature.

The compound of formula I is useful because it possesses pharmacological activity in animals. In particular, the compound of formula I is useful as a neuroleptic agent, for example, in the treatment of psychotic disturbances such as schizophrenia and maniac conditions, as indicated by standard tests, such as the apomorphine antagonising test in rats, on subcutaneous administration of about 0.01 milligram per kilogram animal body weight and the locomotor depression test in mice on peroral administration of about 0.2 milligram per kilogram animal body weight, and as further indicated by the catalepsy test in rats on subcutaneous administration of about 0.7 mg per kilogram animal body weight.

In the catalepsy test, rats, in several intervals after s.c. injection of diverse amounts of active substance, are put with both front paws on a column of 7 cm in altitude, and the duration of persistence of the animal in this unnatural position is measured.

For the above mentioned use the dosage will, of course, vary depending on the compound employed, mode of administration and therapy desired. However, in general, satisfactory results are obtained when administered at a daily dosage of from about 0.01 mg to about 2 mg per kg animal body weight, conveniently given in divided doses 2 to 4 times a day or in sustained release form. For the larger mammals, the total daily dosage is in the range from about 1 to about 50 mg, and dosage forms suitable for oral administration comprise from about 0.25 mg to about 25 mg of the compounds admixed with a solid or liquid pharmaceutical carrier or diluent.

The compound of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate and tartrate and mineral acid salt forms such as the hydrochloride, hydrobromide and sulphate. A pharmaceutical composition may comprise the compound of formula I, in free base form or in pharmaceutically acceptable acid addition salt form, in association with a pharmaceutical carrier or diluent. Such compositions may be prepared by conventional techniques to be in the form of, for example, capsules, tablets, dragees, suspensions or solutions, for enteral or parenteral administration. Aside from the usual pharmaceutical diluents or carriers, e.g., water, alcohols, natural or hardened oils and waxes, these pharmaceutical compositions may contain suitable preserving, stabilizing, wetting, solubilizing, sweetening, flavouring or colouring agents.

EXAMPLE 1

2-nitro-11-(4-methyl-1-piperazinyl)-dibenzo[b,f] [1,4]thiazepine [process variant a)]

2.0 g of 2-nitro-10,11-dihydro-11-oxodibenzo[b,f] [1,4]thiazepine (m.p. 270°–286°C dec.) and 1 ml of N,N-dimethylaniline are refluxed with 15 ml of phosphorus oxychloride for 5 hours, after which the reaction mixture is evaporated to dryness in vacuo. The residue is treated with xylene, once again evaporated in vacuo and then refluxed for 16 hours with 15 ml of N-methylpiperazine and 10 ml of dioxane. After evaporating to dryness in vacuo the residue is distributed between ether and dilute aqueous ammonia solution. The ether phase is washed twice with water and then shaken out with dilute acetic acid. The base is set free from the acid extracts by addition of concentrated ammonia solution and taken up in ether. The ether phase is washed four times with water, dried over sodium sulphate and evaporated. The resinous residue obtained is then dissolved in ether, filtered through aluminum oxide and evaporated. The residue is crystallized from acetone/petroleum ether to give 1.7 g of 2-nitro-11-(4-methyl-1-piperazinyl)dibenzo[b,f] [1,4]thiazepine in the form of yellow matted needles of melting point 141°–142°C.

EXAMPLE 2

2-nitro-11-(4-methyl-1-piperazinyl)-dibenzo[b,f] [1,4]thiazepine [process variant b)]

3.72 g of 2-amino-2'-(4''-methyl-1''-piperazinylcarbonyl)-4'-nitro-diphenylsulphide (m.p. 184°–187°C) and 1 ml of N,N-dimethylaniline are refluxed for 3 hours in 20 ml of phosphorus oxychloride, after which the reaction mixture is evaporated to dryness. The residue is treated with xylene, once again evaporated and then partitioned between benzene and dilute hydrochloric acid. The base is set free from the acid extracts with concentrated ammonia solution and taken up in benzene. The benzene solution is exhaustively extracted with dilute acetic acid and the acetic acid extracts are treated with active charcoal. The basic fraction is set free, under ice-cooling, with concentrated ammonia solution and taken up in chloroform. The chloroform extracts are washed with water, dried over sodium sulphate and evaporated. The residue is dissolved in ether and filtered through aluminum oxide. The residue obtained after evaporation of the solvent is systematically crystallized from acetone/ether/petroleum ether. The first fraction to crystallize is 0.6 g of starting material. 0.72 g of 2-nitro-11-(4-methyl-1-piperazinyl)dibenzo[b,f] [1,4]thiazepine point 138°–141°C are obtained from the more soluble portion.

EXAMPLE 3

In a manner analogous to that described in Examples 1 and 2 there is obtained:

2-nitro-11-(1-piperazinyl)dibenzo[b,f] [1,4]thiazepine, m.p. 153°–155°C (from acetone/petroleum ether).

EXAMPLE 4

Production of solid pharmaceutical compositions

The compound of formula I may be used in free base form or in the form of its pharmaceutically acceptable acid addition salts as active agent in pharmaceutical compositions. Pharmaceutical compositions, for example tablets and capsules, may be formulated by conventional techniques.

Tablets may contain the active agent in admixture with conventional pharmaceutically acceptable excipients, e.g., inert diluents, such as calcium carbonate, sodium carbonate, lactose and talc, granulating and disintegrating agents, e.g., starch and alginic acid, flavouring, colouring and sweetening agents, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a long period.

For the manufacture of tablets, the compound of formula I can be mixed with lactose and granulated with water, 0.5 percent sodium alginate or 1 percent gelatine solution. The dried granulate is compressed into tablets in the presence of about 5 percent of talcum, 5 percent of corn starch and 0.1 percent of magnesium stearate. In this way, there are obtained, e.g. tablets of the following composition:

| Compound of formula I, e.g. an acid addition salt | 5 mg. |
| --- | --- |
| Lactose | 85 mg. |
| Corn Starch | 5 mg. |
| Talcum | 5 mg. |
| Magnesium stearate | 0.1 mg. |

These 100 mg tablets, which are provided with a crackline, can be administered orally in a dosage of one half to one tablet two to four times per day.

Capsules may contain the active agent alone or admixed with an inert solid diluent, for example, as mentioned above.

Capsules containing the ingredients indicated below may be prepared by conventional techniques and are administered at a dose of one capsule 2 to 4 times a day.

| Ingredient | Weight (mg) Capsule |
| --- | --- |
| Compound of formula I, e.g. an acid addition salt | 5 |
| Inert solid diluent (starch, caolin, calcium, phosphate or carbonate, lactose, etc) | 290 |

EXAMPLE 5

Production of liquid pharmaceutical compositions

Solutions, suspensions, emulsions, dispersions, syrups and elixirs may contain the compound of formula I as the active agent in the form as described in the proceeding example in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate), flavouring, colouring and sweetening agents and preservatives (ethyl-p-hydroxybenzoate).

The following pharmaceutical compositions are formulated with the indicated amount of active agent using conventional techniques. The injectable suspension and the oral liquid suspension represent formulations useful as unit doses. The injectable suspension is suitable for administration once a day whereas the oral liquid suspension is suitably administered 2 to 4 times per day for this purpose.

| Ingredients | Weight (mg) | |
| --- | --- | --- |
| | Sterile injectable suspension | oral liquid suspension |
| Compound of formula I, e.g. an acid addition salt | 5 | 5 |
| Sodium carboxy methyl cellulose U.S.P. | 1.25 | 12.5 |
| Methyl cellulose | 0.4 | — |
| Polyvinylpyrrolidone | 5 | — |
| Lecithin | 3 | — |
| Benzyl alcohol | 0.01 | — |
| Magnesium aluminum silicate | — | 47.5 |
| Flavour | — | q.s. |
| Colour | — | q.s. |
| Methyl paraben, U.S.P. | — | 4.5 |
| Propyl paraben, U.S.P. | — | 1.0 |
| Polysorbate 80 (e.g. Tween 80), U.S.P. | — | 5 |
| Sorbitol solution, 70 %, U.S.P. | — | 2,500 |
| Buffer agent to adjust pH for desired stability | q.s. | q.s. |
| Water | for injection q.s. to 1 ml. | q.s. 5 ml. |

What is claimed is:

1. A pharmaceutical composition in the form of a tablet, capsule or dragee useful in treating psychotic disturbances in animals comprising as active ingredient, a therapeutically effective amount of 2-nitro-11-(4-methyl-1-piperazinyl)dibenzo[b,f] [1,4]thiazepine, or a pharmaceutically acceptable acid addition salt thereof, in association with a pharmaceutical carrier or diluent.

2. A pharmaceutical composition in the form of a tablet, capsule or dragee useful in treating psychotic disturbances in animals according to claim 1, wherein the active ingredient is present in said composition in an amount sufficient to provide a daily dosage of from about 1 milligram to about 50 milligrams of the active ingredient.

3. A pharmaceutical composition in the form of a tablet, capsule or dragee useful in treating psychotic disturbances in animals according to claim 2, in unit dosage form, wherein the amount of active ingredient is from about 0.25 milligrams to about 25 milligrams.

4. A method of treating psychotic disturbances in animals, which comprises administering to an animal in need of said treatment a therapeutically effective amount of 2-nitro-11-(4-methyl-1-piperazinyl)-dibenzo[b,f][1,4]thiazepine, or a pharmaceutically acceptable acid addition salt thereof.

5. A method according to claim 4, which comprises administering to the animal a daily dosage of from about 0.01 to about 2 mg per kilogram animal body weight of 2-nitro-11-(4-methyl-1-piperazinyl)-dibenzo[b,f][1,4]thiazepine, or a pharmaceutically acceptable acid addition salt thereof.

6. A method according to claim 5, which comprises administering to the animal a daily dosage of from about 1 mg to about 50 mg of 2 nitro-11-(4-methyl-1-piperazinyl)dibenzo[b,f][1,4]thiazepine, or a pharmaceutically acceptable acid addition salt thereof.

7. A method according to claim 6, wherein the daily dosage is given in divided doses 2 to 4 times a day.

* * * * *